US005901220A

United States Patent [19]

Garver et al.

[11] Patent Number: 5,901,220

[45] Date of Patent: May 4, 1999

[54] NETWORK INTERFACE DEVICE

[75] Inventors: William Joseph Garver; Sam Denovich, both of Harrisburg; Maris Anthony Glass, York, all of Pa.

[73] Assignee: The Whitaker Corporation, Wilmington, Del.

[21] Appl. No.: 08/808,301

[22] Filed: Feb. 28, 1997

[51] Int. Cl.[6] .................... H04M 1/00

[52] U.S. Cl. .................... 379/399; 379/441

[58] Field of Search .................... 379/399, 397, 379/451, 412, 441, 442; 439/521, 535

[56] References Cited

U.S. PATENT DOCUMENTS

| | | | |
|---|---|---|---|
| D. 347,618 | 6/1994 | Butler, III et al. | D13/133 |
| 4,749,359 | 6/1988 | White | 439/133 |
| 4,809,323 | 2/1989 | Collins et al. | 379/399 |
| 4,827,504 | 5/1989 | Collins et al. | 379/399 |
| 4,910,770 | 3/1990 | Collins et al. | 379/399 |
| 4,945,559 | 7/1990 | Collins et al. | 379/399 |
| 4,949,376 | 8/1990 | Nieves et al. | 379/399 |
| 4,979,209 | 12/1990 | Collins et al. | 379/399 |
| 5,297,199 | 3/1994 | Graham et al. | 379/399 |
| 5,313,519 | 5/1994 | Mickelson et al. | 379/399 |
| 5,333,193 | 7/1994 | Cote et al. | 379/399 |
| 5,355,408 | 10/1994 | Lanquist et al. | 379/397 |
| 5,359,654 | 10/1994 | Jensen et al. | 379/397 |
| 5,394,466 | 2/1995 | Schneider et al. | 379/399 |
| 5,410,596 | 4/1995 | Shannon et al. | 379/412 |
| 5,414,765 | 5/1995 | Lanquist et al. | 379/399 |
| 5,416,837 | 5/1995 | Cote et al. | 379/399 |
| 5,420,920 | 5/1995 | Capper et al. | 379/399 |
| 5,479,505 | 12/1995 | Butler et al. | 379/412 |
| 5,497,416 | 3/1996 | Butler, III et al. | 379/399 |
| 5,548,641 | 8/1996 | Butler et al. | 379/399 |
| 5,553,136 | 9/1996 | Meyerhoefer et al. | 379/399 |
| 5,570,422 | 10/1996 | Napiorkowski et al. | 379/399 |
| 5,600,716 | 2/1997 | Broome et al. | 379/399 |
| 5,600,717 | 2/1997 | Schneider et al. | 379/399 |
| 5,637,011 | 6/1997 | Meyerhoefer et al. | 439/409 |
| 5,671,273 | 9/1997 | Landquist | 379/399 |

*Primary Examiner*—Daniel S. Hunter
*Assistant Examiner*—Charles N. Appiah
*Attorney, Agent, or Firm*—Salvatore Anastasi; Anton P. Ness

[57] ABSTRACT

The present invention is related to a network interface device 10 and a network interface module 50 for mounting therein. The network interface device 10 features two covers 12, 32. The first cover 32 restricts access to the service provider section of the device, and the second cover 12 covers both the service provider section 24 and the subscriber section 22. The network interface module 50 is profiled to span between the subscriber section 22 and the service provider section 24 so as to eliminate the need for separate components in each section.

11 Claims, 5 Drawing Sheets

NETWORK INTERFACE DEVICE

FIELD OF THE INVENTION

The present invention relates to the field of network interface devices, and more particularly to customer-accessible network interface modules.

BACKGROUND OF THE INVENTION

Network interface devices provide limited access by a subscriber or customer for testing by the subscriber of the subscriber premises wiring, at a telephone junction box where the subscriber premises wiring is connected to circuits of the telephone service provider. Such junction boxes are also fully accessible to service personnel of the telephone company after installation. One such network interface device is disclosed in U.S. Pat. No. 4,979,209 for a plurality of subscribers, wherein an enclosure includes a primary lid extending over the entire enclosure and securable by service personnel, and a secondary lid over the subscriber-accessible portion of the enclosure securable by the subscribers; such enclosures commonly provide access to the subscriber-accessible portion by service personnel but the subscriber-accessible portion remains secured against any unauthorized person. Individual modules within the subscriber-accessible portion are disclosed to include individual security covers such that each subscriber module is secured against access by the other subscribers.

The individual subscriber module includes a test port or jack electrically connected to both the premises wiring and the subscriber-dedicated circuits of the telephone service provider, such as wires extending to a distribution cable, enabling the subscriber to remove the port cover and insert the plug of a telephone or other test device to discover the location of a fault disrupting the subscriber's service. Successful connection of the telephone or test device indicates that the fault lies in the premises wiring and thus is the responsibility of the subscriber, whereas an unsuccessful connection of the telephone or test device indicates that the fault lies in the circuits of the telephone service provider. The performance of such testing by the subscriber enables the subscriber to first determine the location of the fault prior to arranging with the telephone company for a service call, thus saving the subscriber the expense of a telephone company service call when the fault lies in the premises wiring.

In U.S. Pat. No. 5,420,920 is disclosed a subscriber module having a test port or jack in which pairs of contacts are interconnected by a dedicated plug inserted thereinto to complete circuits between the telephone cable and the premises wiring for regular inservice use. When the dedicated plug is removed during an investigation of a fault, another plug joined to a telephone device is insertable by the subscriber to again complete the circuits to determine the presence or absence of a fault in the telephone company wiring. The dedicated plug of the module is adapted to seal the jack cavity when in position, protecting the contacts exposed in the jack, and is joined to the module by a lanyard when removed from the jack. Conductors of the premise wiring are easily terminable by insulation displacement techniques to terminals using a stuffer cap, with the terminals connected to first contacts of the jack contact pairs by circuit board traces, while second contacts of the pairs are connected by other board traces to conductors connected to the distribution cable.

A problem exists with each of these subscriber modules in that the modules are insertable into the network interface device such that the module resides in a subscriber accessible section of such a network interface device. A pair of wires extends from the subscriber module through a divider or a wall into the service provider section of the network interface device for connection to protection circuits and service cables. The protection circuits are typically provided in a separate device mountable inside the service provider section. Therefore, two devices, a subscriber network interface module and a protection device, are necessary in order to complete the circuit between the service provider section and the subscriber section of the network interface device.

SUMMARY OF THE INVENTION

It is therefore an object of this invention to provide a network interface module capable of connecting service cables to a subscriber telephone line through a single device.

This object has been achieved by providing a network interface module being mountable inside a network interface device The network interface module provides electrical connections to a subscriber cable and has a test jack receptacle both located in a subscriber accessible section of the network interface device. The network interface module is designed to have an electrical connector for connection to a pair of wires of a service provider cable located in a service provider section of the network interface device. An integral circuit protector device is also provided in the network interface module and is electrically connected between the service provider cable and the subscriber cable. The network interface module is mounted inside the network interface device such that it spans between the subscriber accessible section and the service provider section.

BRIEF DESCRIPTION OF THE DRAWINGS

The invention will now be described by way of example with reference to the accompanying figures of which.

DETAILED DESCRIPTION OF THE INVENTION

Figure 1:
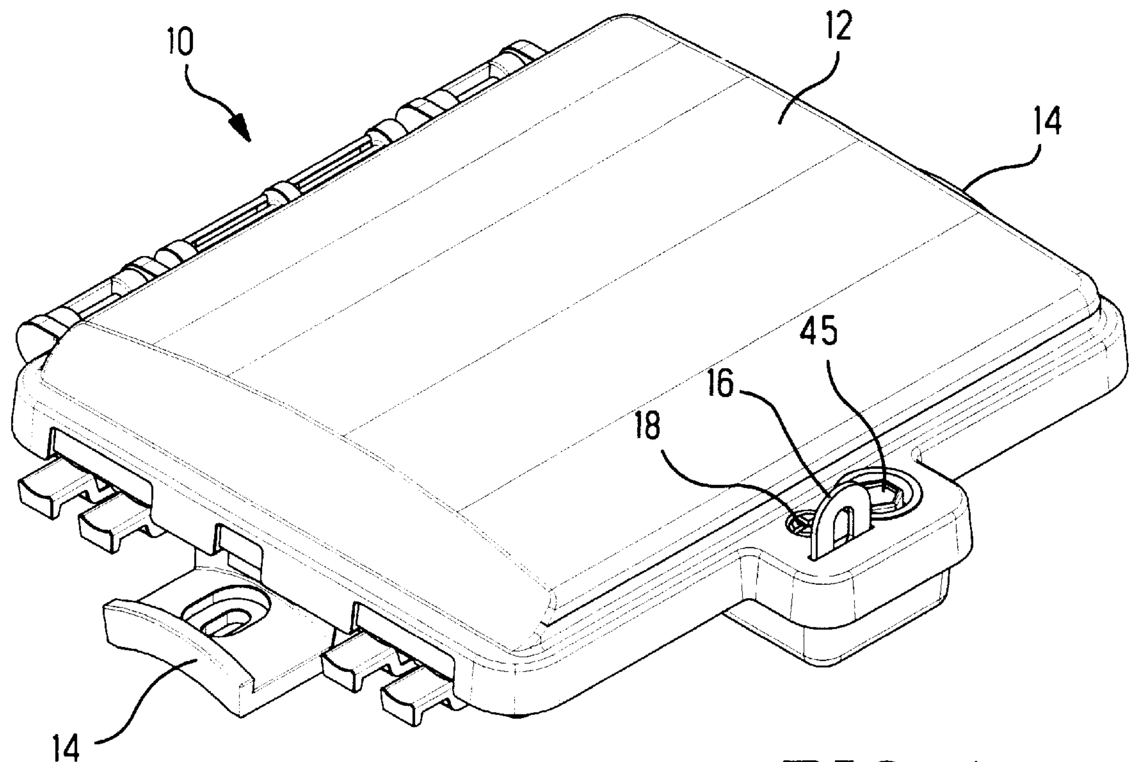
FIG. 1 shows a three-dimensional view of the network interface device of the present invention.
Figure 2:
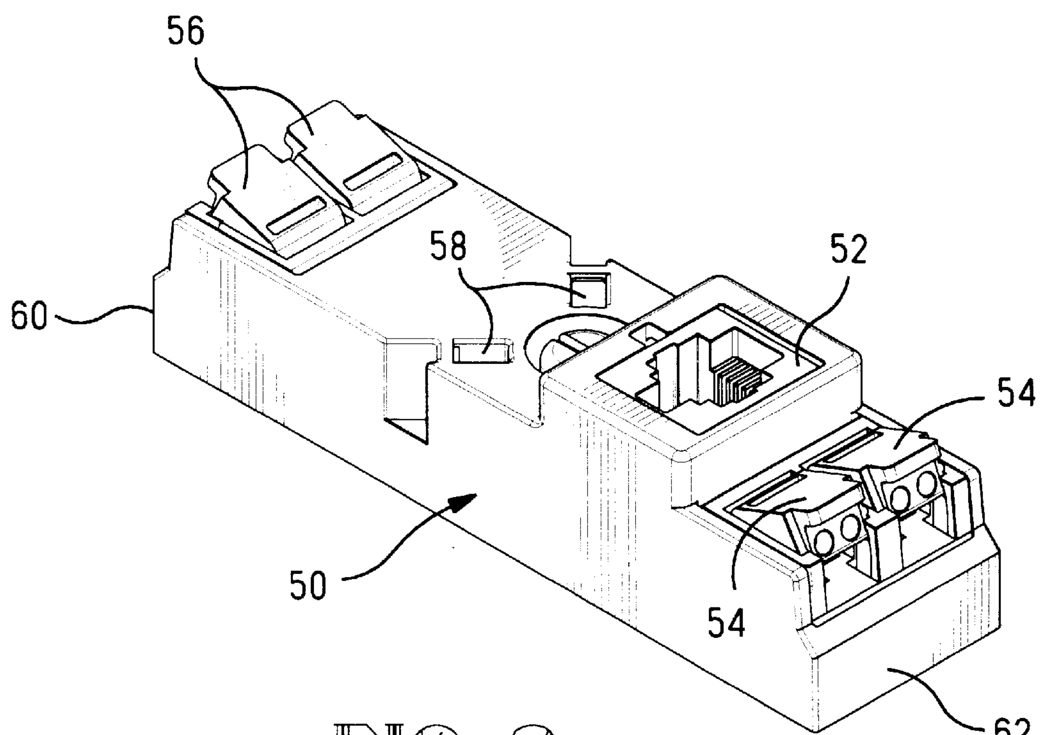
FIG. 2 shows a three-dimensional view of the network interface module according to the present invention.

The network interface device 10 and the network interface module 50 will be first described generally with reference to FIGS. 1 and 2. Referring to FIG. 1, the network interface device 10 is shown having a pair of mounting brackets 14 for mounting the device 10 to a subscriber premise. A cover 12 is provided and is hingeably mounted on one side and secured to the device 10 on the opposite side by an appropriate fastener 18. A locking eyelet 16 is provided for inserting a lock therethrough for restricting access to the device 10.

Referring to FIG. 2, a network interface module 50 according to the present invention is shown. The network interface module 50 is mountable inside the network interface device 10 and features a pair of pivot connectors 54 which are disclosed and more fully described in copending U.S. Pat. No. 5,667,402. These pivot connectors 54 are located at the subscriber end 62 and provide electrical connection to subscriber cables which enter the subscriber premise. A test jack receptacle 52 as disclosed in copending U.S. patent application Ser. No. 08/573,336 filed DEC. 15, 1995 (now abandoned) is provided adjacent the pivot connectors 54. This test jack receptacle 52 provides means for detecting whether a fault lies in the premise wiring or the service provider cable. It also provides a point of demarcation between the subscriber cable and the service provider cable. A pair of test terminals 58 are disposed adjacent the test jack receptacle 52 and finally a pair of pivot connectors 56 are located at the service provider end 60 for connection to the service provider cable.

Figure 3:
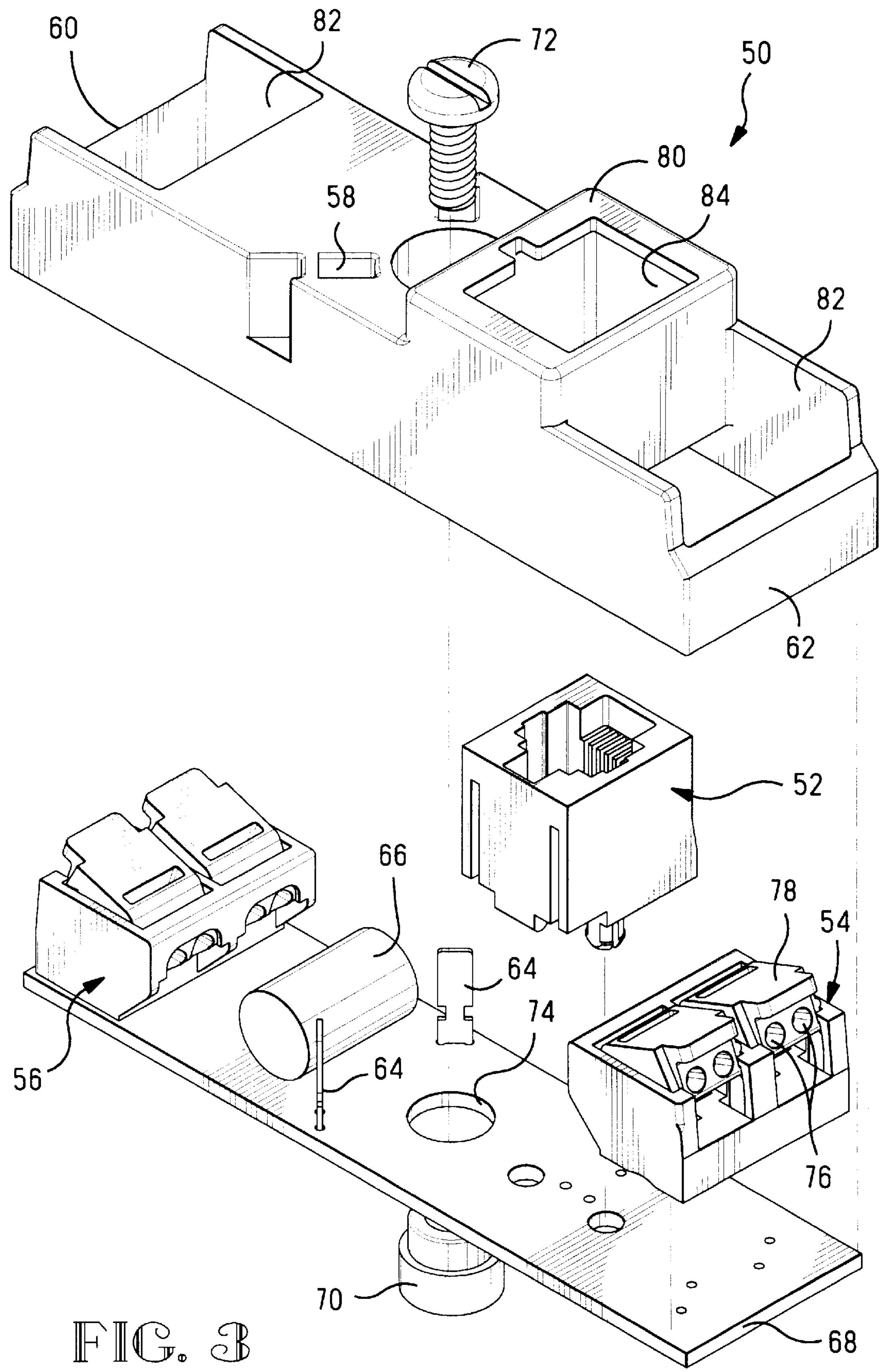
FIG. 3 shows an exploded three-dimensional view of the network interface module.

The network interface module 50 will now be described in greater detail with reference to FIG. 3. The module 50 contains a printed circuit board 68 upon which all of the major components are mounted. First, the pivot connector 54 is disposed at the subscriber end 62 and is electrically connected to circuit traces on the printed circuit board 68 for connection to the other major components of the module 50. The pivot connector 54 establishes electrical connection to a pair of subscriber wires through passageways 76 which receive IDC terminals upon rotation of the wire carrier 78 to a closed position. The design and operation of this pivot connector 54 is more specifically described in copending U.S. Pat. No. 5,667,402. The test jack receptacle 52 is mounted to the printed circuit board 68 adjacent the pivot connector 54. This test jack receptacle 52 is more fully described in copending U.S. patent application Ser. No. 08/573,336 filed Dec. 15, 1995 (now abandoned). It contains a switching mechanism which will complete an electrical circuit between the subscriber side 62 of the module and the service provider side 60 of the module when it is an unmated condition. Upon mating with a test plug (not shown), the switching mechanism will actuate to disconnect the circuit between the subscriber side 62 and the service provider side 60. Actuation of the switch upon insertion of a test plug serves to allow a subscriber to test the service provider line connected to the pivot connectors 56 which will be described below. Continuing down the module from the subscriber side 62 towards the service provider side 60, immediately adjacent the test jack receptacle 52 appears a point of demarcation between the subscriber side 62 and the service provider side 60 of the module 50.

A pair of test terminals 64 are mounted to the circuit board immediately beyond the point of demarcation. Each of these test terminals 64 are electrically connected to tip and ring circuits of the service provider cable through circuit traces on the printed circuit board 68. Alternatively, these test terminals 64 could be electrically connected to the subscriber cable through traces on the printed circuit board 68 in order to test the subscriber cable. A circuit protector device 66 is provided along the printed circuit board 68 between the test terminals 64 and service provider end 60. Once again, this circuit protector device 66 is electrically connected to traces on the printed circuit board 68 and serves to protect the subscriber premise wiring from an electrical surge appearing on the service provider cable. At the service provider end 60, a pivot connector 56 similar to the pivot connector 54 provides electrical connection to the service provider cable. A cover 80 is mountable over the major components and the printed circuit board 68 and has a pair of apertures 82 through which the pivot connectors 54 and 56 pass. Aperture 84 allows access to the test jack receptacle 52, and apertures 58 provide access to the test terminals 64. A ground bushing 70 is secured to the bottom of the printed circuit board 68 inside the opening 74 and is electrically connected to a ground trace on the printed circuit board 68. Finally, a fastener 72 is provided for securing the module 50 to the network interface device 10. The fastener 72 is threadably received into openings 42 of the ground buss 40. The printed circuit board 68 is typically secured to the cover 80 by a potting material that is inserted into the module 50 from the bottom.

Figure 4:
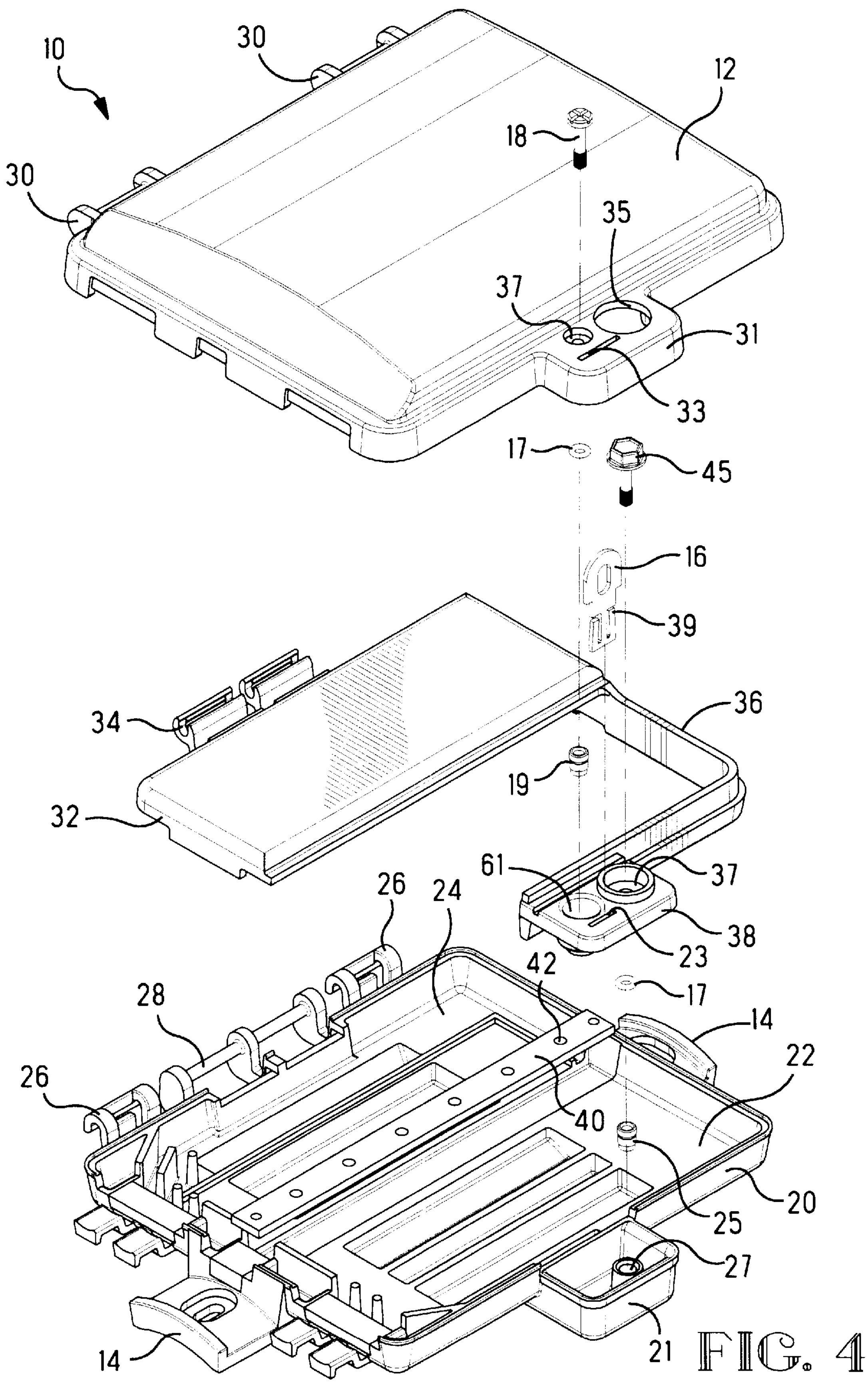
FIG. 4 shows an exploded three-dimensional view of the network interface device.

Referring now to FIG. 4, the network interface device 10 will be described in greater detail. A base 20 consists of a subscriber section 22 and a service provider section 24. A ground buss 40 separates the subscriber section 22 from the service provider section 24. Mounting holes 42 are provided along a top surface of the divider 40. A series of hinge members 26,28 are disposed along a first side of the device 10. The hinge members 28 are cooperable with complementary hinge members 34 of the first cover 32 while hinge members 26 are cooperable with complementary hinge members 30 of the second cover 12. Mounting brackets 14 are provided on opposite ends for securing the device 10 to a subscriber premise. A securing section 21 is provided along a side opposite the hinge members 26,28. A collar 25 is secured into an opening 27 at the securing section 21. It should be noted that this and the subsequently described collar 19 are threaded on the inside and are press fit into their respective openings 21,61.

A first cover 32 is hingeably mounted to the base 20 at hinge members 34,28. The first cover 32 is profiled to cover only the service provider section 24 of the base 20. An extension arm 36 extends from the free end of the first cover 32 toward a locking tab 38 that is disposed over the securing section 21 of the base 20. The locking tab 38 has an eyelet member 16 secured thereto in a slot 23. A collar 19 is also received in the tab 38 at opening 61 and secured thereto. A threaded 45 fastener is disposed inside securing aperture 37 and captivated therein on O-ring 41. This threaded fastener is securable to the collar 25.

Figure 5:
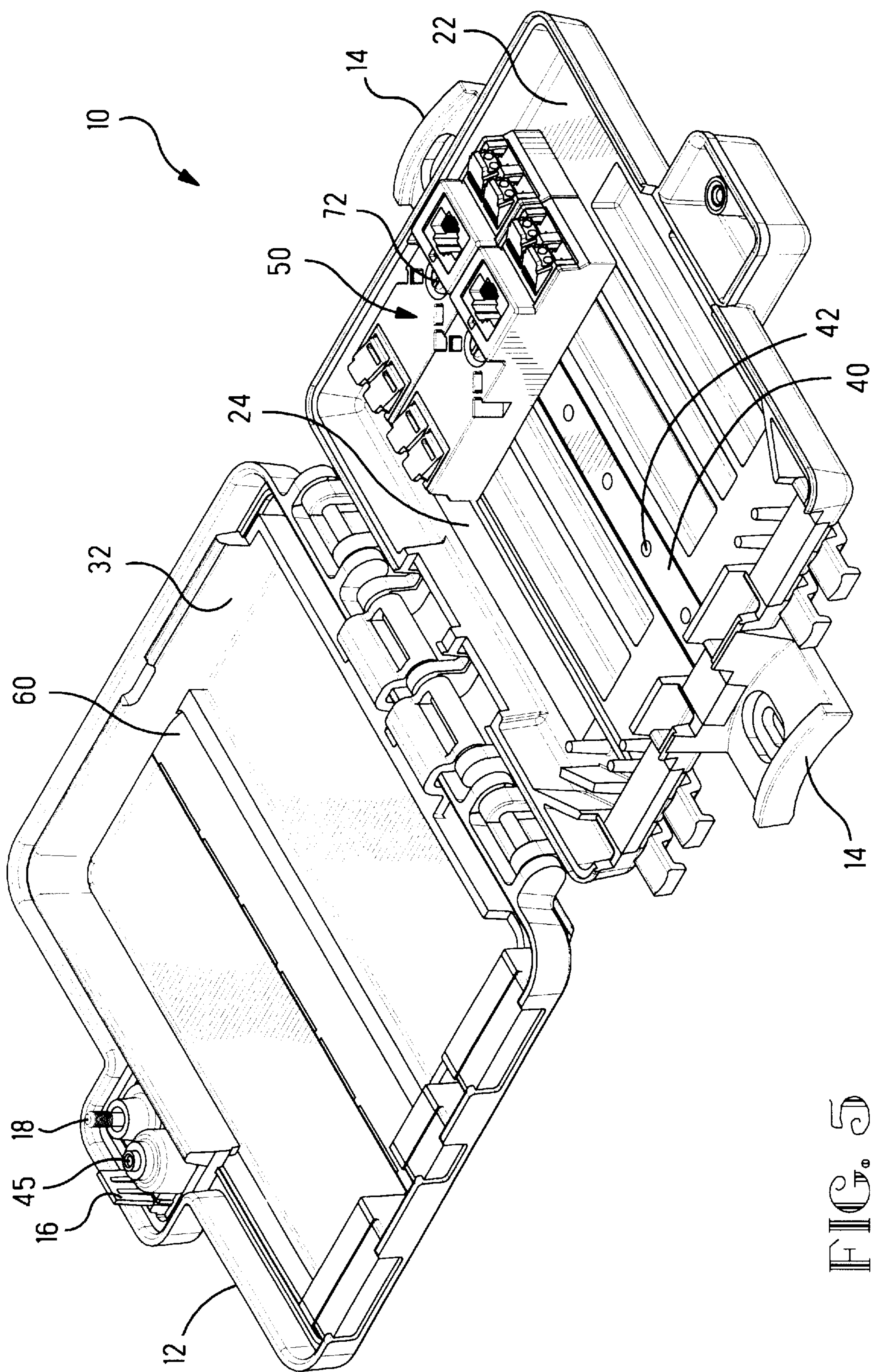
FIG. 5 shows a three-dimensional view of the assembled network interface device having both covers in the open position.
Figure 6:
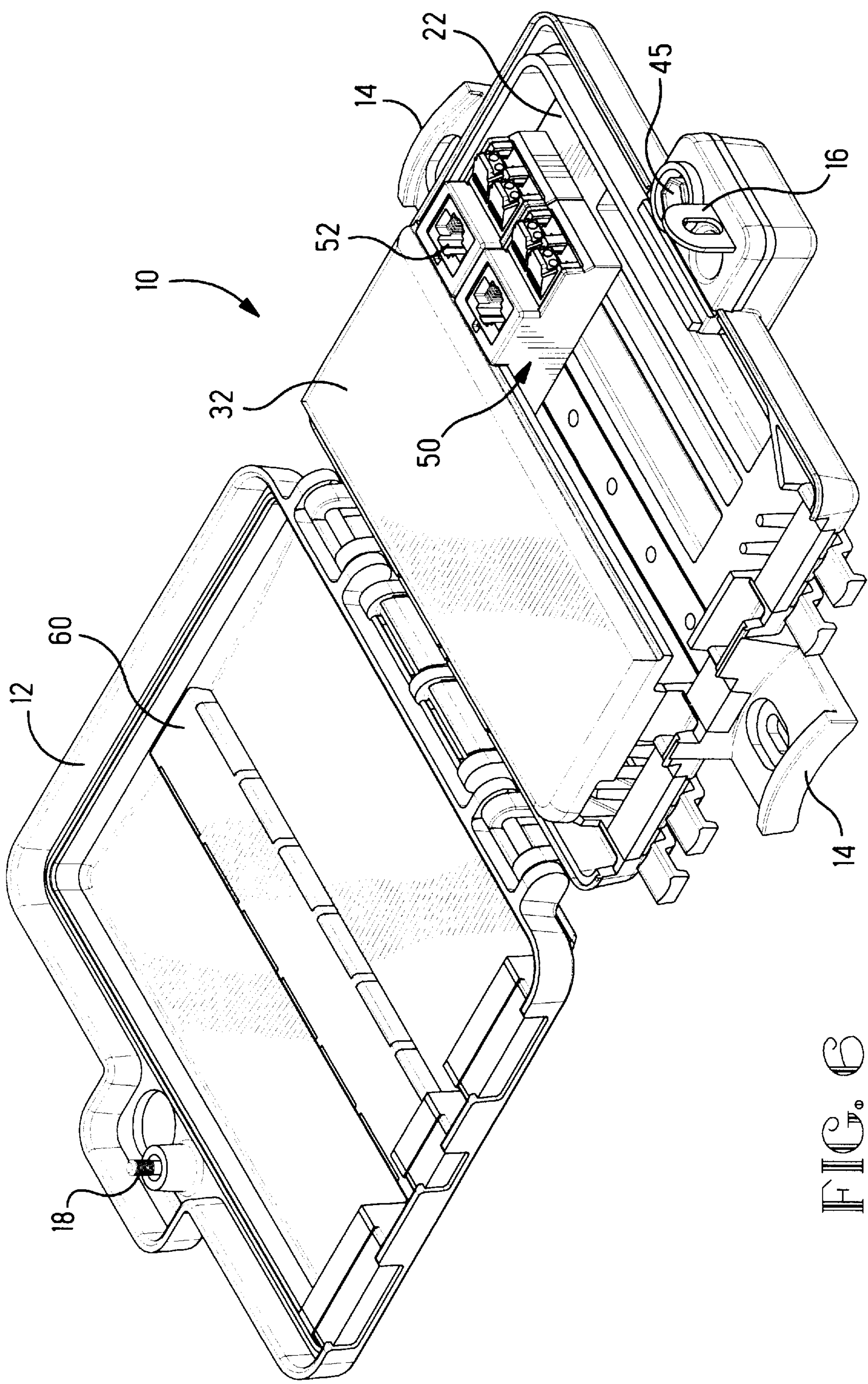
FIG. 6 shows a three-dimensional view of the network interface device having only the subscriber cover in the open position.

A second cover 12 is hingeably mounted to the base 20 by cooperation of hinge members 26 with complementary hinge members 30. The second cover 12 is profiled to cover both the subscriber section 22 and the service provider section 24. This cover 12 is disposed over the first cover 32. A securing tab 31 is disposed along the free end of the second cover 12 and features a slot 33D 10 an aperture 35 and a securing aperture 37. A threaded fastener 18 passes through the securing aperture 37 and is captivated therein by O-ring 17. This threaded fastener 18 is securable to the collar 19 mounted in the mounting tab 38 of the first cover 36. A seal member 60 is disposed on the inside of the second cover 12 as best seen in FIGS. 5 & 6. This seal member may be formed of a sealing gel or other suitable sealing material and is positioned to lie over the test jack receptacles 52 when the cover 12 is in the closed position as shown in FIG. 1.

Assembly of the network interface device 10 will now be described in greater detail with reference once again to FIG. 4. The collar 25 is fixed into the opening 27 of the base 20. The collar 19 is then inserted into the tab 38 and secured thereto The locking eyelet 16 is inserted into slot 23 and secured therein by lances 39. The threaded fastener 45 is then inserted into securing aperture 37 and is held therein by the O-ring 41 through which it passes. The first cover member 32 is then hingeably mounted to the base 20 by inserting hinge members 28 into open ends of complementary hinge members 34. The first cover member 32 is secured to the base by threading the fastener 45 into the collar 25. The second cover 12 is assembled to the base 20 by inserting complementary hinge members 30 into open ends of hinge members 26. Securing of the second cover 12 is accomplished by threading the fastener 18 into the collar 19 to complete assembly of the network interface device.

Referring to FIG. 5, assembly of the network interface modules 50 into the network interface device 10 will be described in greater detail. First, both covers 12,32 are opened at shown here. Next, the modules 50 are secured to the top surface of the ground buss 40 by cooperation of fasteners 72 with mounting holes 42. The fasteners 72 serve to establish the ground connection between the ground bushing 70 and the ground buss 40. It should be noted at this point that each of the modules 50 spans between the subscriber section 22 and the service provider section 24 over the divider 40. As can be seen in FIG. 6, access to the service provider section 24 is restricted by closing and securing the first cover 32 as shown here. It should also be noted that by securing this cover 32, the customer only has access to the portion of the module 50 which is beyond the point of demarcation and lies on the subscriber section 22 mentioned above. The seal member 60 on the inside of the second cover 12 serves to seal the top opening of the test jack receptacles 52 when in the closed position as shown in FIG. 1.

The advantage of this invention is that it provides a network interface module 50 which is insertable into a network interface device 10 such that it spans between the subscriber section 22 and the service provider section 24, thus eliminating the need for wires crossing between the sections to connect the module 50 to the service provide devices and cable.

An additional advantage of the present invention is that a single module 50 is utilized in place of a subscriber module which was previously mounted in the subscriber section 22 and the protector device which was previously mounted in the service provider section 24. Thus the number of components and the number of electrical connections have been reduced.

We claim:

1. A network interface module being mountable inside a network interface device providing electrical connections to a subscriber cable and a test jack receptacle both located in a subscriber accessible section of the network interface device, the network interface module comprising:

an electrical connector for connection to a pair of wires in a service provider cable located in a service provider section of the network interface device;

an electrical connector for connection to a pair of wires in a subscriber section of the network interface device; and a fastening section intermediate the electrical connectors in the service provider and subscriber sections adapted for conductive fasteners to cooperate therewith to mechanically secure the module to a ground buss in the device and simultaneously establish a ground connection of a ground circuit of the module to the ground buss.

2. The network interface module as recited in claim 1 wherein the module is securable to the network interface unit at a top surface of a ground buss.

3. A network interface module as recited in claim 1 further comprising a pair of test ports having test terminals therein which can be individually probed to test tip and ring circuits of the module.

4. The network interface module as recited in claim 1 further comprising an integral circuit protector device electrically connected between the electrical connector and the subscriber cable.

5. The network interface module as recited in claim 1 wherein the fastening section is defined through a housing and a circuit board of the module that includes integral circuits interconnecting terminals of the electrical connectors in the service provider and subscriber portions of the device.

6. A network interface device having a customer accessible portion and a service provider portion which is restricted from access by the subscriber, the device comprising:

a base having a divider disposed between the service provider portion and the subscriber portion, and a plurality of hinge members disposed along a hinge end thereof, a first cover being hingeably mounted to the base at the hinge end and being profiled to restrict access to the service provider portion while allowing access to the subscriber portion, a second cover being hingeably mounted to the base over the first cover and being profiled to cover both the subscriber and service provider portions, and at least one module having electrical connectors in the service provider and subscriber sections for establishing electrical connection to a service provider cable and a subscriber cable, the module including a fastening section intermediate the electrical connectors in the service provider and subscriber sections adapted for conductive fasteners to cooperate therewith to mechanically secure the module to a ground buss in the device and simultaneously establish a ground connection of a around circuit of the module to the ground buss.

7. The network interface device as recited in claim 6 wherein the network interface module is mounted to a top surface of the ground buss.

8. The network interface device as recited in claim 6 wherein the second cover has a sealing member disposed on an inner surface thereof.

9. The network interface device as recited in claim 8 wherein the sealing member is located such that it seals an open end of the test jack receptacle, when the second cover is in a closed position.

10. The network interface device as recited in claim 6 further comprising a circuit protector and a test receptacle.

11. The network interface device as recited in claim 6 wherein the fastening section is defined through a housing and a circuit board of the module that includes integral circuits interconnecting terminals of the electrical connectors in the service provider and subscriber portions of the device.

* * * * *